United States Patent [19]

Swanson et al.

[11] 3,819,567

[45] June 25, 1974

[54] SEALER COMPOSITION OF AN ACRYLIC-EPOXY ESTER GRAFT COPOLYMER AND AN EPOXY RESIN

[75] Inventors: Ralph G. Swanson, Pinellas Park, Fla.; Aloysius N. Walus, Flint, Mich.

[73] Assignee: E. I. Du Pont de Nemours and Company, Wilmington, Del.

[22] Filed: Dec. 1, 1972

[21] Appl. No.: 311,397

Related U.S. Application Data

[63] Continuation-in-part of Ser. No. 204,705, Dec. 3, 1971.

[52] U.S. Cl..... 260/42.28, 117/124 E, 117/132 BE, 117/138.8 UA, 117/148, 117/161 ZB, 117/161 UZ, 260/22 CB, 260/23 EP, 260/30.6 R, 260/31.2 XA, 260/31.8 E, 260/32.8 EP, 260/33.2 EP, 260/33.4 EP, 260/33.6 UA, 260/834, 260/835, 260/837, 260/851, 260/856

[51] Int. Cl............................................ C08g 45/04

[58] Field of Search .... 260/41 R, 41 A, 41 B, 41 C, 260/836, 837

[56] References Cited
UNITED STATES PATENTS

| | | | |
|---|---|---|---|
| 3,272,647 | 9/1966 | Swanson et al. | 117/75 |
| 3,467,611 | 9/1969 | Wolinski | 260/836 |
| 3,505,269 | 4/1970 | Jeffery et al. | 260/32.8 |
| 3,509,086 | 4/1970 | Rohrbacher | 260/32.8 |
| 3,524,902 | 8/1970 | Feltzin | 260/837 R |
| 3,538,185 | 11/1970 | Davis et al. | 260/836 |
| 3,657,196 | 4/1972 | Foster | 260/837 R |

*Primary Examiner*—John C. Bleutge

[57] ABSTRACT

The sealer composition contains a polymeric binder dissolved in an organic solvent in which the polymeric binder comprises the following components:

A. an acrylic-epoxy ester graft copolymer that has a backbone of methyl methacrylate, styrene, ethyl acrylate, acrylonitrile or mixtures thereof, contains 1–7% of methacrylic acid or acrylic acid which has been reacted with an alkylene imine and the polymeric side-chain segments of the graft copolymer are epoxy esters of an epoxy resin and an aliphatic dicarboxylic acid; and B. an epoxy hydroxy polyether resin;

the novel composition forms a high quality coating and is particularly useful as a sealer composition for automobiles and trucks.

10 Claims, No Drawings

SEALER COMPOSITION OF AN ACRYLIC-EPOXY ESTER GRAFT COPOLYMER AND AN EPOXY RESIN

CROSS-REFERENCE TO RELATED APPLICATIONS

This application is a continuation-in-part application of Ser. No. 204,705, filed Dec. 3, 1971.

BACKGROUND OF THE INVENTION

This invention relates to a coating composition and in particular to a high quality sealer composition of an acrylic-epoxy ester graft copolymer and an epoxy resin.

Sealer compositions are well known in the automobile and truck manufacturing industry and are applied over primed steel substrates to form a smooth even surface over which an acrylic lacquer, an acrylic dispersion lacquer or an acrylic enamel topcoat is applied. Typical sealer compositions are shown in Swanson and Walus U.S. Pat. No. 3,272,647 issued Sept. 13, 1966; Jeffrey et al. U.S. Pat. No. 3,505,269, issued Apr. 7, 1970; Rohrbacher U.S. Pat. No. 3,509,086 issued Apr. 28, 1970. These prior art sealer compositions are excellent for many purposes, however there is a great need in the automobile manufacturing industry today for a sealer coat that provides a finish with excellent mar, chip and crack resistance, outstanding corrosion resistance, that has an exceptional high level of adhesion to all types of primer coatings including electrodeposited primer coatings and that provides a surface to which acrylic topcoats will have excellent adherence. The novel composition of this invention utilizes and acrylic-epoxy ester graft copolymer in combination with an epoxy resin and provides a composition that has these outstanding characteristics.

SUMMARY OF THE INVENTION

The sealer composition of this invention comprises about 2–50% by weight of a binder dissolved in an organic solvent, wherein the binder consists essentially of A. 40–70% by weight, based on the weight of the binder, of an acrylic-epoxy ester graft copolymer that has a number average molecular weight o about 10,000–150,000 and has a polymeric backbone segment and polymeric side-chain segments; wherein 1. the polymeric backbone segment of the graft copolymer comprises 20–80% by weight, based on the weight of the graft copolymer, and consists essentially of polymerized units that are either methyl methacrylate, styrene, ethyl acrylate, acrylonitrile or mixtures thereof;
1–7% by weight based on the weight of the copolymer, of an acid which can either be methacrylic acid or acrylic acid which has been reacted with an alkylene imine in the presence of an organic solvent; and 2. the polymeric side-chain segment of the graft copolymer comprises correspondingly 80–20% by weight, based on the weight of the graft copolymer, and are grafted into the backbone segment and the backbone segment portion having the side chain attached thereto has the following formula:

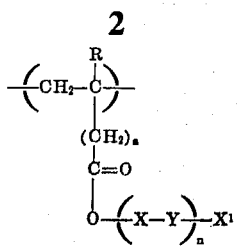

wherein a is 0-1 and when a is 1, R is the moiety obtained by reacting the

group with an alkylene imine and when a is 0, R is the moiety obtained by reacting the

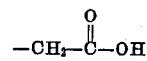

group with an alkylene imine, X is the residual of a polyepoxide resin having a molecular weight of about 400 – 4,000 which has been reacted with a saturated aliphatic dicarboxylic acid or a dimer fatty acid, and Y is the residual of a saturated aliphatic dicarboxylic acid that has 4–15 carbon atoms or a dimer fatty acid, and n is a positive integer of 3–10; and $X^1$ is the residual of a polyepoxide that has been reacted with the above dicarboxylic acid or dimer acid and has a terminal epoxide group; and B. correspondingly 60–30% by weight, based on the weight of the binder, of an epoxy-hydroxy polyether resin having the following recurring structural unit

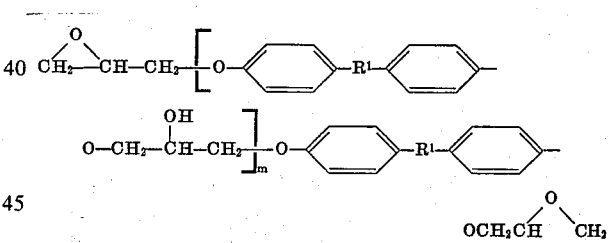

Where $R^1$ is an alkylene group having 1–4 carbon atoms and m is a positive integer that is sufficiently large to provide a molecular weight of about 15,000–200,000.

DESCRIPTION OF THE INVENTION

The novel composition of this invention preferably has a polymeric binder content of about 5–25% by weight. The polymeric binder preferably comprises 40–60% of the acrylic epoxy ester graft copolymer and correspondingly 60–40% by weight of the epoxy resin. The novel composition can be clear or pigmented and if pigmented contains about 0.1–30% by weight of pigment.

The composition has excellent physical properties such as good adhesion to bare metal substrates, chip resistance, crack and mar resistance and corrosion resistance. The composition can be used as a primer over bare metals but is particularly useful as a sealer composition which is applied over primed metal surfaces. Acrylic enamel, acrylic lacquer, acrylic dispersion lacquer, water based acrylic lacquers and acrylic powder topcoats have excellent adhesion to the novel sealer composition and form particularly attractive finishes.

The novel composition can also be utilized as a sealerless primer, or as a primer surfacer. Also, the novel composition can be used as a topcoating for appliances such as refrigerators, stoves, washers, driers and the like.

The graft copolymer utilized in the novel composition of this invention is prepared by first forming an epoxy ester prepolymers which are the side-chain segments of the graft copolymer using conventional polymerization techniques. These epoxy ester prepolymers are prepared so that each prepolymer chain contains at least one ethylenically unsaturated dicarboxylic acid such as itaconic acid. Maleic acid and fumaric acid also can be used. These prepolymers and the backbone acrylic monomer units are polymerized to form the graft copolymer. The ethylenically unsaturated group of the epoxy ester prepolymer polymerizes with the backbone monomer units and couples the epoxy ester prepolymer to the backbone of the graft copolymer. The resulting epoxy ester graft copolymer has a number average molecular weight of about 10,000–150,000 and preferably 15,000–50,000; the graft copolymer comprises about 20–80% by weight, preferably 30–60% by weight of backbone segment, and correspondingly, 80–20% by weight, and preferably 70–40% by weight, of side chain segments. The side chain segments have a molecular weight in the range of about 2,000–20,000.

The epoxy ester prepolymers are prepared by conventional polymerization techniques in which an epoxy hydroxy polyether resin which can also be termed a polyepoxide resin, a saturated aliphatic dicarboxylic acid or a dimer fatty acid and an ethylenically unsaturated dicarboxylic acid are blended together with solvents, and a polymerization catalyst and are heated to about 120°–200° C. for about 1–3 hours to form the epoxy ester prepolymer. The resulting epoxy ester prepolymers have one terminal troup of ethylenic unsaturation provided by the itaconic acid monomer and are terminated with the epoxy phenoxy polyether resin. The resulting prepolymer structure can be illustrated as follows: itaconic acid/epoxy polyether resin/dicarboxylic acid/epoxy polyether resin.

Typical solvents and diluents which are used to prepare the epoxy ester prepolymer are, for example, toluene, xylene, butyl acetate, acetone, methylisobutyl ketone, methylethyl ketone, butyl alcohol, hexane, cellosolve, cellosolve acetate, V M & P naphtha, mineral spirits and other aliphatic, cycloaliphatic, aromatic hydrocarbons, esters, ethers, ketones and alcohols.

About 0.1–4% by weight, based on the total weight of the monomers used to prepare the epoxy ester prepolymer, of a polymerization catalyst is used, such as sulfonic acid, orangic tin compounds, such as dibutyl tin dilaurate, dibutyl tin oxide, litharge, titanium complexes, aromatic ammonium hydroxide compounds, for example, benzyltrimethylammonium hydroxide and tetramethylammonium chloride.

The epoxy hydroxy polyether resins utilized in preparing the epoxy ester prepolymers have the repeating structural formula

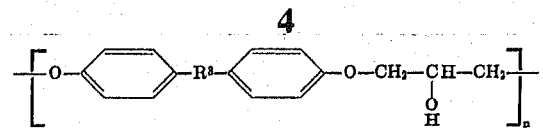

wherein n is an integer sufficient to provide the epoxy resin with a molecular weight of at least about 400 and up to about 4,000, and preferably, epoxy resins are used that have a molecular weight of 1,500–3,000.

One preferred epoxy resin is the reaction product of epichlorohydrin and bisphenol A that provides a resin in which $R^3$ is

This epoxy resin readily forms a graft copolymer which has a balance of desired physical properties, such as high tensile strength, excellent solvent resistance and excellent adhesion to substrates and to acrylic lacquers or enamel topcoats. Another very useful epoxy resin is the reaction product of epichlorohydrin and bisphenol F which provides a resin in which $R^3$ is $-CH_2-$.

Typical dicarboxylic acids that can be used to prepare the epoxy ester prepolymers are, for example, aliphatic dicarboxylid acids having 4–15 carbon atoms, dimer acids or a mixture of any of these acids and anhydrides of these acids. Typical saturated aliphatic dicarboxylic acids are succinic, glutaric, adipic, pimelic, suberic, azelaic, brassic, dodecanodoic, brassylic and the like. Dimer fatty acids are the dimerization products of ethylenically unsaturated drying oil fatty acids. Typically useful dimer fatty acids are "Empol" 1014, "Empol" 1022, "Empol" 1024. One particularly useful dimer fatty acid is the dimerization product of an 18 carbon atom drying oil fatty acid.

The graft copolymer is then prepared by adding the backbone constituents to the above epoxy ester prepolymers. The constituents can be diluted with one of the aforementioned solvents and a polymerization catalyst is added and the constituents are heated to about 75°–150° C. for about 2–6 hours to form the graft copolymer.

Another method that can be used is to add the backbone monomers to the epoxy resin, itaconic acid and dicarboxylic acid mixture. The aforementioned epoxy ester prepolymers will be first formed and then on the addition of the polymerization catalyst for the esterification polymerization reaction and upon addition of the vinyl polymerization catalyst, the backbone monomer units polymerize and form the backbone of the polymer.

About 0.1–4% by weight, based on the weight of the constituents used to prepare the graft copolymer, of an azo polymerization catalyst for the backbone monomers is used, such as azo-bis-isobutyronitrile.

Typical monomer units which are used to form the backbone of the graft copolymer are styrene, acrylonitrile, methyl methacrylate, ethylacrylate or mixtures thereof. Up to 7% by weight of the copolymer of units of $\alpha,\beta$-unsaturated monocarboxylic acid can be used such as, acrylic acid, and methacrylic acid.

About 0.5 to 5% by weight, based on the weight of the backbone segment of the polymer, of acrylic monomers which have compatibilizing or adhesion promoting groups, can be utilized. Typical monomers of this type are hydroxyaminopropyl methacrylate, diethylamino-ethyl methacrylate, dimethylaminoethyl methacrylate, 2-aminopropyl methacrylate, 2-aminoethyl methacrylate, t-butylaminoethyl methacrylate, 2-(1-aziridinyl)-ethyl methacrylate, n-2-hydroxypropylacrylamide, n-2-hydroxyethylmethacrylamide and 3-(2-methacryloxyethyl)-2,2-spirocyclohexyloxazolidine.

After the acrylic-epoxy ester graft copolymer is formed, it is reacted with alkyleme imine of the formula

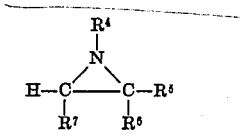

to esterify the pendent carboxyl groups on the polymer. In the formula, $R^4$ is either hydrogen, benzyl, or a $C_1-C_5$ alkyl radical, $R^5$ and $R^6$ are either hydrogen, benzyl, aryl, or a $C_1-C_5$ alkyl radical and $R^7$ is either hydrogen and $R^5$ is either hydrogen or methyl. The two preferred alkylene imines are ethylene imine and propylene imine.

About 30–60% by weight and preferably 40–60% by weight of an epoxy hydroxypolyether resin having the following structure

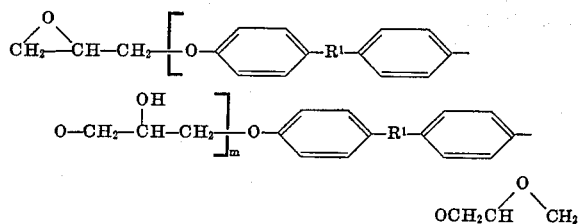

where $R^1$ is an alkylene group of 1–4 carbon atoms and m is a positive integer sufficiently large to provide a weight average molecular weight of 15,000 to 200,000.

One preferred epoxy resin is the reaction product of the aforementioned epichlorohydrin and bisphenol A provides a resin in which $R^1$ is

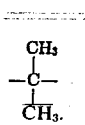

Another very useful epoxy resin is the reaction product of epichlorohydrin and bisphenol F which provides a resin in which $R^1$ is -$CH_2$-.

One useful class of epoxy resins have a weight average molecular weight of about 15,000–45,000, and preferably 25,000–35,000, and have an epoxide content of about 0.40–0.7% by weight, based on the weight of the resin, preferably about 0.5% by weight. The molecular weight distribution of these epoxy resins is 2.1–2.5, and preferably 2.3–2.4.

Small amounts of a plasticizer, for example, 0.1–5% by weight, based on the weight of film-forming constituents, can also be used in the novel composition, such as butyl benzyl phthalate, dibutyl phthalate, triphenyl phosphate, 2-ethylhexybenzyl phthalate, dicyclohexyl phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexylester of hexamethylene diphthalate, di(methylcyclohexyl) phthalate.

Other plasticizers that can be used are epoxidized soya bean oil, oil-free and oil-modified alkyd resins, and polyesters, such as polyethylene terephthalate esters, polyalkylene adipate esters, polyacrylene adipate esters, polyesters of adipic acid/neopentyl glycol/benzoic acid, coconut oil/phthalic anhydride/ethylene glycol and the like.

Pigments can be used in the novel sealer composition of this invention in the amounts of 0.1–30.0% by weight, and preferably, about 10–25% by weight of pigment, is used. Preferably, the pigment is formed into a mill base using conventional techniques and then blended with the composition. Examples of the great variety of pigments which are used in the novel sealer composition of this invention are metallic oxides, preferably titanium dioxide, and iron oxide and the like, metal hydroxides, metal flakes, such as aluminum flake, metal powders, chromates, such as lead chromate, sulfides, sulfates, silicates such as calcium silicate, magnesium silicate, aluminum silicate, carbonates, carbon black, silica talc, china clay, organic reds, maroons, organic dyes, lakes, etc. One preferred pigment blend for sealerless primer composition is as follows: carbon black, titanium dioxide and aluminum silicate.

Optionally, the novel sealer composition of this invention can contain from about 2–20% by weight, based on the weight of the film-forming constituents, of a heat reactive condensate. Typical heat reactive condensates that are used are as follows: melamine/formaldehyde, melamine/formaldehyde that has been at least partially reacted with an aliphatic monohydric alcohol having 1–4 carbon atoms, urea/formaldehyde, benzoguanamine/formaldehyde, toluene sulfonamide and the like. In general, melamine formaldehyde resins that are methylolated and have from 3–6 methylol groups are useful in this invention. Typical resins of this type are hexamethoxymethylol melamine, melamine/formaldehyde/methanol resin wherein the molar ratio is about 1/5/3.

An aqueous sealer or primer composition can be prepared by blending the acrylic-epoxyester graft copolymer with a water soluble or water dispersible resin. One particularly useful resin is an epoxy ester resin of maleinized drying oil fatty acids such as linseed oil fatty acids reacted with maleic anhydride and an epoxyhydroxypolyether resin of the type described above to prepare the epoxy ester prepolymer of the graft copolymer. These aqueous compositions contain 60–95% by weight of the epoxy ester resin of the maleinized drying oil fatty acids and correspondingly 5–40% by weight of the acrylic epoxy ester graft copolymers. The polymers used in these compositions are at least partially neutralized with a water soluble amine to make the polymers water soluble or water dispersible and the resulting compositions have a pH of about 6-9. These aqueous compositions can be pigmented with the above pigments at the levels indicated above and can contain water dispersible or water soluble plasticizers and crosslinking agents such as hexa(methoxymethyl)melamine.

The novel sealer compositions of this invention can be applied to a variety of substrates, for example, unprimed or primed metal substrates, wood, glass, plastics, such as polypropylene, styrene, copolymers of styrene and the like, by any of the usual application methods, such as spraying, electrostatic spraying, dipping, brushing, flow coating and the like. These coatings are baked at about 110°-200° C. for about 10-60 minutes. The resulting coating is about 0.1-2 mils thick, preferably 0.1-1 mils thick and can be buffed or sanded in accordance with conventional techniques, if desired, to improve smoothness.

The novel sealer composition of this invention has excellent adhesion to bare or treated metals or to metals which have been previously painted with alkyd or acrylic enamels. Also, in addition to its use as a sealer-less primer, the novel composition can be a highly pigmented coating or can be used as a clear sealer coating. When used as a primer or a sealer composition, topcoats of lacquers and enamels have excellent adherence to the novel coating composition of this invention which also has excellent mar and chip and scratch resistance.

The following Examples illustrate this invention. The parts and percentages are by weight unless otherwise specified.

EXAMPLE 1

An epoxy acrylic copolymer is prepared by blending the following ingredients:

|  | Parts by Weight |
|---|---|
| Portion 1 |  |
| Epoxy resin ("Epon" 1004*) | 366.80 |
| Adipic acid monomer | 24.00 |
| Itaconic acid monomer | 9.20 |
| Benzyl trimethyl ammonium hydroxide solution (40% solids in methanol) | 4.00 |
| Lithium ricinoleate | 0.40 |
| Ethylene glycol monobutyl ether | 100.00 |
| Portion 2 |  |
| Ethylene glycol monoethyl ether | 167.00 |

*"Epon" 1004 has the following structural formula

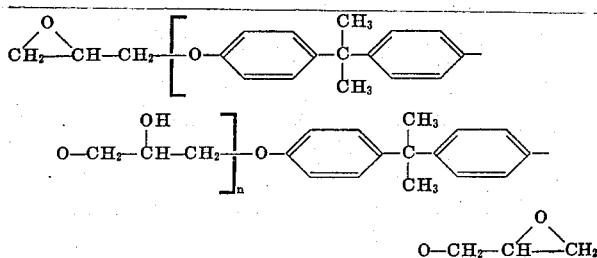

n is a positive integer sufficiently large to provide a Gardner Holdt viscosity measured on undiluted resin at 25°C. of Q-U poises and has an epoxy equivalent of 875-1025. The epoxy equivalent is the grams of resin containing 1-gram equivalent of epoxide.

|  | Parts By Weight |
|---|---|
| Portion 3 |  |
| Isopropyl alcohol | 429.00 |
| Dodecyl mercaptan | 4.00 |
| Ethyl acetate | 500.00 |
| Portion 4 |  |
| Methyl methacrylate monomer | 368.00 |
| Tertiary butyl amino ethyl methacrylate | 8.00 |
| Methacrylic acid monomer | 24.00 |
| Azo-bis-isobutyronitrile | 2.00 |
| Portion 5 |  |
| Azo-bis-isobutyronitrile | 1.00 |
| Portion 6 |  |
| Azo-bis-isobutyronitrile | 0.50 |
| Portion 7 |  |
| Azo-bis-isobutyronitrile | 0.50 |
| Portion 8 |  |
| Propylenimine | 26.00 |
| Total | 2034.40 |

Portion 1 is premixed and charged into a reaction vessel equipped with a stirrer, a heating mantel, a thermometer and a reflux condenser and the ingredients are heated until a solution is formed and then heated to reflux with constant agitation for 60 minutes at 150°-160° C. Portion 2 is then added and then Portion 3 which is premixed is added over a 9 minute period. Portion 4 is premixed and then added over a 3 minute period and then the reaction mixture is heated to its reflux temperature and is maintained at reflux for about 1 hour. Portion 5 is added and the reaction mixture is refluxed for 30 minutes. Portion 6 is added and the reaction mixture is refluxed for an additional ½ hour. Portion 7 is added and the reaction mixture is refluxed for another hour. The heat is then turned off and Portion 8 is added and the reaction mixture is held slightly below its reflux temperature for an another hour and the polymer solution is cooled to room temperature.

The resulting polymer solution has a polymer solids content of about 39.7% and a Gardner Holdt viscosity measured at 25° C. of about X. The polymer has an acid number of about 0.8 and a relative viscosity of about 1.105 measured at 0.5% polymer solids in dimethyl formamide at 25° C.

A mill base is prepared as follows:

|  | Parts By Weight |
|---|---|
| Polymer solution (prepared above) | 23.79 |
| Ethylene glycol monoethylether | 7.27 |
| Methyl ethyl ketone | 9.35 |
| Isopropanol | 7.00 |
| Toluene | 6.55 |
| Carbon Black Pigment | 0.79 |
| Titanium Dioxide Pigment | 22.74 |
| Aluminum Silicate Pigment | 22.51 |
| Total | 100.00 |

The above ingredients are blended together and charged into a standard sand mill and ground to a fineness of 0.2 mils.

A coating composition is then prepared by blending the following ingredients:

| | Parts By Weight |
|---|---|
| Polymer solution (prepared above) | 23.78 |
| Epoxy Resin solution (40% polymer solids in methyl ethyl ketone of a polymer of epichlorohydrin and bisphenol A that has a weight average molecular weight of about 30,000, a number average molecular weight distribution of 2.34 and an epoxide content of 0.5% by weight) | 22.33 |
| Diethyl amine | 0.08 |
| Toluene | 8.54 |
| Acetone | 12.20 |
| Ethylene glycol monobutyl ether | 9.49 |
| Isopropanol | 9.14 |
| Mill Base (prepared above) | 14.44 |
| Total | 100.00 |

The above ingredients are thoroughly blended together and the resulting sealer composition is then reduced to a spray viscosity of about 18 seconds measured in a No. 1 Fisher Cup at 25° C. using the following solvent blend: 31% methyl ethyl ketone, 24.1% ethylene glycol monoethyl ether, 23.2% isopropanol and 27.1% toluene.

The sealer composition is then sprayed onto the following primed steel plates: a steel plate primed with an iron oxide pigmented alkyd resin primer, a steel plate primed with a black epoxy/alkyd primer, a steel plate primed with a titanium dioxide pigmented acrylic resin. After the sealer is sprayed onto the above steel substrates, each of the substrates is air dried. The resulting sealer coating on each of the substrates is about 0.25–0.50 mils in thickness.

A coating of a standard automotive acrylic lacquer is then applied over the sealer coating and baked using conventional spraying and baking procedures. On a second set of the above primed steel plates a standard acrylic enamel is applied and baked using conventional procedures. Each of the above prepared steel plates is then tested for chip resistance by a standard gravelometer chip test, for adhesion of the sealer coat to the primer coat and for corrosion resistance. Each of the above steel plates exhibit excellent chip resistance, good corrosion resistance, and the sealer composition has excellent adhesion to the primer substrate and to the acrylic topcoat.

EXAMPLE 2

An epoxy acrylic graft copolymer is prepared by blending the following ingredients:

| | Parts By Weight |
|---|---|
| Portion 1 | |
| Epoxy resin ("Epon" 1004 described in Example 1) | 369.3 |
| Adipic acid monomer | 26.0 |
| Itaconic acid monomer | 4.7 |
| Benzyltrimethyl ammonium hydroxide solution (40% solids in methanol) | 4.0 |
| Lithium ricinoleate | 0.4 |
| Ethylene glycol monobutyl ether | 172.0 |
| Portion 2 | |
| Ethylene glycol monoethyl ether | 228.0 |
| Portion 3 | |
| Isopropyl alcohol | 398.0 |
| Ethyl acetate | 400.0 |
| Dodecyl mercaptan | 2.0 |
| Portion 4 | |
| Methyl methacrylate monomer | 360.0 |
| Tertiary butyl aminoethyl methacrylate | 8.0 |
| Methacrylic acid monomer | 32.0 |

| -Continued | Parts By Weight |
|---|---|
| Azobisisobutyronitrile Portion 5 | 2.0 |
| Azobisisobutyronitrile Portion 6 | 1.0 |
| Azobisisobutyronitrile Portion 7 | 0.5 |
| Azobisisobutyronitrile Portion 8 | 0.5 |
| Propylenimine | 30.0 |
| Total | 2038.4 |

The polymer is prepared according to the polymerization procedure described in Example 1. The polymer solution has a solids content of about 39.5% and a Gardner Holdt viscosity measured at 25° C. of about Y. The polymer has an acid number of about 0.4 and a relative viscosity measured in dimethyl formamide at 25° C. of about 1.108.

A mill base is prepared by blending the following ingredients:

| | Parts By Weight |
|---|---|
| Polymer solution (prepared above) | 23.79 |
| Ethylene glycol monoethyl ether | 7.27 |
| Methylethyl ketone | 9.35 |
| Isopropanol | 7.00 |
| Toluene | 6.55 |
| Carbon black pigment | 0.79 |
| Titanium dioxide pigment | 22.74 |
| Aluminum silicate pigment | 22.51 |
| Total | 100.00 |

The above ingredients are blended together and charged into a standard sand mill and ground to a fineness of 0.2 mils.

A coating composition is then prepared by blending the following ingredients:

| | Parts By Weight |
|---|---|
| Polymer solution (prepared above) | 27.47 |
| Epoxy resin solution (described in Example 1) | 13.13 |
| Diethyl amine | 0.08 |
| Toluene | 9.49 |
| Acetone | 13.57 |
| Ethylene glycol monoethyl ether | 10.55 |
| Isopropanol | 10.15 |
| Mill base (prepared above) | 15.56 |
| Total | 100.00 |

The above ingredients are thoroughly blended together and the resulting sealer composition is then reduced to a spray viscosity of about 18 seconds and measured in a No. 1 Fisher Cup at 25° C. using the solvent blend described in Example 1.

The sealer composition is they sprayed onto the following primed steel plates: a steel plate primed with an iron oxide pigmented alkyd resin primer, a steel plate primed with a black epoxy/alkyd primer, a steel plate primed with a titanium dioxide pigmented acrylic resin. After the sealer is sprayed onto the above steel substrates, each of the substrates is air dried. The resulting sealer coating on each of the substrates is about 0.25–0.50 mils in thickness.

A coating of a standard automotive acrylic lacquer is then applied over the sealer coating and baked using conventional spraying and baking procedures. On a second set of the above primed steel plates a standard acrylic enamel is applied and baked using conventional procedures. Each of the above prepared steel plates is then tested for chip resistance by a standard gravelometer chip test, for adhesion of the sealer coat to the primer coat and for corrosion resistance. Each of the above steel plates exhibit excellent chip resistance, good corrosion resistance, and the sealer composition has excellent adhesion to the primer substrate and to the acrylic topcoat.

EXAMPLE 3

A resin solution is prepared by reacting a maleic anhydride with linseed oil fatty acids:

|  | Parts By Weight |
|---|---|
| Portion 1 | |
| Linseed oil fatty acids | 2,670 |
| Maleic anhydride | 930 |
| Xylene | 111 |
| Portion 2 | |
| Cyclohexaonone | 289 |
| Total | 4,000 |

Portion 1 is charged into a reaction vessel equipped with a stirrer, a reflux condenser, a heating mantel and a nitrogen inlet. The ingredients are blanketed with the nitrogen gas and then heated slowly up to about 200° C. for an hour and a half and continued for 4½ hours to complete the reaction. Portion 2 is then slowly added over a fifteen minute period. The resulting resin has an acid number of 280–300 determined by an alcoholic potassium hydroxide solution. The resin solution has solids content of about 90% and is hereinafter referred to as MALOFA Resin solution.

A high molecular weight Epoxy/MALOFA resin solution is prepared as follows:

|  | Parts By Weight |
|---|---|
| Portion 1 | |
| Epoxy resin ("Epon" 828*) | 463 |
| Bis-phenol A(p,p'-isopropylidenediphenol) | 191 |
| Diethylene glycol monobutyl ether acetate | 204 |
| Cyclohexanone | 80 |
| Acetone | 10 |
| Portion 2 | |
| Bis-phenol A (p,p'-isopropylidenedi-phenol) | 56 |
| Portion 3 | |
| Dimethyl benzylamine | 6 |
| Portion 4 | |
| Acetone | 82 |
| Diethylamine | 6 |

*"Epon" 828 has the following structural formula

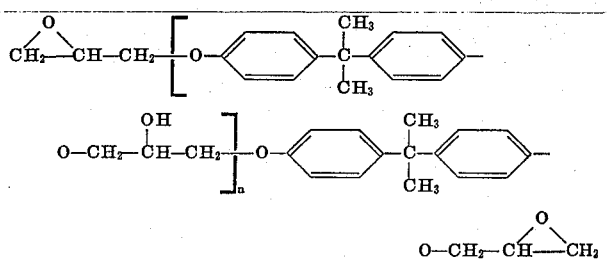

n is a positive integer sufficiently large to provide a Gardner Holdt viscosity measured on undiluted resin at 25°C. of 100–160 poises and has an epoxy equivalent of 180–195. The epoxide equivalent is the grams of resin containing 1-gram equivalent of epoxide.

|  | Parts By Weight |
|---|---|
| Portion 5 | |
| Acetone | 42 |
| Portion 6 | |
| MALOFA resin solution (prepared above) | 333 |
| Portion 7 | |
| Ethylene glycol monobutyl ether | 193 |
| Total | 1666 |

Portion 1 is charged into a reaction vessel equipped with a stirrer, a reflux condenser and a heating mantel and the reaction mixture is heated to its reflux temperature and maintained at its reflux temperature for about a half hour. The reaction mixture is cooled to about 160° C. and the Portion 2 is added and immediately after Portion 2 is added, Portion 3 is added. The reaction mixture is then heated to its reflux temperature of about 175° C. and held at this temperature for about 1 hour and 20 minutes. Portion 4 is then slowly added over a 30 minute period and the temperature of the reaction mixture is allowed to cool to about 85° C. and then the reaction mixture is brought back to its reflux temperature of about 90° C. Portion 5 is then added and then Portion 6 is added and the reaction mixture held for 90 minutes at 80°–90° C. Then Portion 7 is added to dilute the reaction mixture.

The resulting polymer has an acid number of about 83 and the polymer solution has a Gardner Holdt viscosity of Z6$^{-4}$ and a polymer solids content of about 60%.

A mill base is prepared as follows:

|  | Parts By Weight |
|---|---|
| Epoxy/MALOFA resin solution (prepared above) | 540 |
| Dimethylethanolamine | 78 |
| Deionized water | 1182 |
| Carbon black pigment (electrically conductive carbon black) | 180 |
| Aluminum silicate pigment | 612 |
| Titanium dioxide pigment | 3000 |
| Total | 5592 |

The above ingredients are mixed together in the order given and then charged into a steel ball mill and ground for 16 hours. The resulting mill base has a total solids of 50.8% and a pigment content of 40% by weight, a binder content of 10.8% by weight.

A water reducible sealer composition is prepared as follows:

|  | Parts By Weight |
|---|---|
| Epoxy/MALOFA resin solution (prepared above) | 42.5 |
| Epoxy acrylic graft copolymer solution (prepared in Example 2) | 42.5 |
| Dimethyl ethanolamine | 13.0 |
| Deionized water | 172.0 |
| Mill base (prepared above) | 250.0 |
| Total | 571.0 |

The above ingredients are thoroughly blended together to form a sealer composition which has a solids content of 35%, a pigment to binder ratio of 100:100 and a pH of about 6–9. The resulting sealer composition is then reduced to a spray viscosity above 18 seconds measured in a No. 1 Ford cup at 25° C. by reducing the composition with an equal volume of water.

The sealer is then sprayed onto the following sets of primed steel panels (3 per set): a steel panel primed with an iron oxide pigment alkyl resin primer, a steel panel primed with a titanium dioxide pigmented acrylic resin. After the sealer is sprayed onto the above steel panel each of the panels is air dried. The resulting sealer coating is about 0.1 mils of thickness.

A coating of a standard automotive acrylic lacquer is then applied over the sealer coating on each of the panels and baked using conventional spraying and baking procedures. On a second set of the above primed and sealed panels an acrylic powder coating is electrically deposited on the panels and baked by using conventional procedures. On a third set of the above primed and sealed panels a water based thermosetting acrylic enamel is applied and baked using conventional procedures. Each of the above sets of steel panels is then tested for chip resistance by a standard Gravelometer chip test for adhesion of the sealer coat to the primer coat and topcoat and each set of panels is also tested for corrosion resistance. In the Gravelometer chip test, the panels are chilled to −18° C. and gravel about ¼ to ½ inch in diameter is thrown against the panel at about 80 pounds per square inches air pressure. Each of the above steel panels exhibits excellent chip resistance, good corrosion resistance and the sealer composition has excellent adhesion to the primer substrate and to the top coat.

The invention claimed is:

1. A sealer composition comprising about 2–50% by weight of a binder dissolved in an organic solvent and about 0.1–30% by weight pigment, wherein the binder consists essentially of A. 40–70% by weight, based on the weight of the binder, of an acrylic-epoxy ester graft copolymer having a number average molecular weight of about 10,000–150,000 and a polymeric backbone segment and polymeric side chain segments; wherein 1. The polymeric backbone segment of the graft copolymer comprises 20–80% by weight, based on the weight of the graft copolymer, and consists essentially of polymerized
units selected from the group consisting of methyl methacrylate, styrene, ethyl acrylate, acrylonitrile and mixtures thereof;
1–7% by weight of an acid selected from the group consisting of methacrylic acid and acrylic acid that has been reacted in the presence of an organic solvent with an alkylene imine selected from the group consisting of ethyleneimine and propyleneimine; and 2. The polymeric side chain segments of the graft copolymer comprise correspondingly 80–20% by weight, based on the weight of the graft copolymer, and are grafted into the backbone segment and the backbone segment portion having the side chain attached thereto has the formula

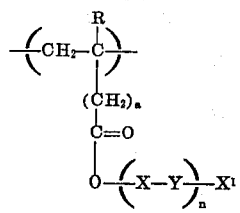

wherein a is 0–1 and when a is 1, R is the moiety obtained by reacting the

group with said alkylene imine and when a is O, R is the moiety obtained by reacting the

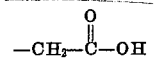

with said alkylene imine, X is the residual of a polyepoxide resin having a molecular weight of about 400–4,000 which has been reacted with a saturated aliphatic dicarboxylic acid or a dimer fatty acid, Y is the residual of said saturated aliphatic dicarboxylic acid having 4–15 carbon atoms or said dimer fatty acid and n is a positive integer of 3 to 10 and X¹ is the residual of a polyepoxide which has been reacted with said dicarboxylic acid or said dimer acid and has a terminal epoxide group;

B. correspondingly 60–30% by weight, based on the weight of the binder, of an epoxy hydroxy polyether resin having the following formula

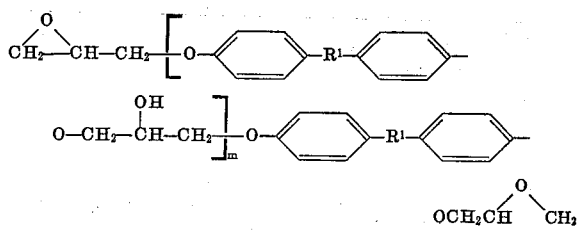

where R¹ is an alkylene group of 1–4 carbon atoms and m is a positive integer sufficiently large to provide a weight average molecular weight of about 15,000–200,000.

2. The sealer composition of claim 1 having a polymeric binder content of 5–25% by weight and wherein the polymeric binder components comprise 40–60% by weight of the acrylic-epoxy ester graft copolymer and correspondingly 60–40% by weight of the epoxyhydroxypolyether resin.

3. The sealer composition of claim 2 in which the graft copolymer has a number average molecular weight of about 15,000–50,000 and the backbone segment comprises 30–60% by weight of the graft copolymer and the side chain segment comprises 70–40% by weight of the graft copolymer.

4. The sealer composition of claim 3 in which the acrylic ester graft copolymer contains 0.5–5% by weight of polymerized monomers in the backbone selected from the group consisting of hydroxy amino propyl methacrylate, 3-(2-methacryloxyethyl)-2,2- spirocyclohexyl oxazolidine, diethyl amino ethyl methacrylate, 2-aminopropyl methacrylate, 2-aminoethyl methacrylate, 2-(1-aziridinyl)-ethyl methacrylate, t-butyl aminoethyl methacrylate, dimethyl ethyl methacrylate, hydroxy propyl methacrylamide and hydroxyethyl methacrylamide.

5. The sealer composition of claim 4 in which the polymer backbone segment consists essentially of methyl methacrylate, tertiary butylamino ethyl methacrylate, and methacrylic acid that has been reacted with propylene imine.

6. The sealer composition of claim 4 in which the polymeric backbone consists essentially of methyl methacrylate, diethylamino ethyl methacrylate, methacrylic acid has been reacted with propylene imine.

7. The sealer composition of claim 3 wherein x of the polymeric side chain segment is a polyepoxide resin of the formula

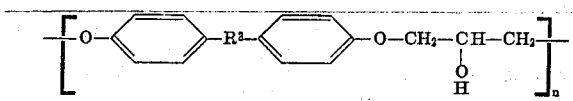

wherein n is an integer sufficient to provide the epoxy resin with a molecular weight of at least about 400 and up to 4,000, wherein Y is the residual of a saturated aliphatic dicarboxylic acid having 4–10 carbon atoms.

8. The sealer composition of claim 7 in which R of the side chain segment has been reacted with propylene imine and Y is the residual of adipic acid.

9. The sealer composition of claim 3 in which $R^1$ of the epoxy hydroxy polyether resin is selected from the group consisting of

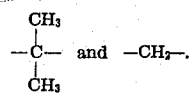

10. The sealer composition of claim 9 containing about 2–20% by weight of pigment which comprises titanium dioxide pigment, carbon black pigment, and aluminum silicate pigment.

* * * * *